(12) United States Patent
Bellanti

(10) Patent No.: US 7,789,436 B2
(45) Date of Patent: Sep. 7, 2010

(54) COLLAR FOR JOINING TWO PIPES COMPRISING ONE RESPECTIVE CONNECTING NECK

(75) Inventor: Bruno Bellanti, Saint Martin d'Heres (FR)

(73) Assignee: A. Raymond et Cie, Grenoble (FR)

( * ) Notice: Subject to any disclaimer, the term of this patent is extended or adjusted under 35 U.S.C. 154(b) by 59 days.

(21) Appl. No.: 12/299,837

(22) PCT Filed: Jun. 13, 2007

(86) PCT No.: PCT/EP2007/005190

§ 371 (c)(1),
(2), (4) Date: Nov. 6, 2008

(87) PCT Pub. No.: WO2007/147510

PCT Pub. Date: Dec. 27, 2007

(65) Prior Publication Data

US 2009/0243292 A1    Oct. 1, 2009

(30) Foreign Application Priority Data

Jun. 22, 2006    (DE) .................. 10 2006 028 605

(51) Int. Cl.
*F16L 23/12* (2006.01)
*F16L 23/00* (2006.01)
(52) U.S. Cl. ................ 285/406; 285/87; 285/88; 285/325; 285/326
(58) Field of Classification Search ........... 285/82, 285/87, 88, 325, 326, 363, 364, 405, 406
See application file for complete search history.

(56) References Cited

U.S. PATENT DOCUMENTS

| 1,173,061 | A | * | 2/1916 | Tregloune | ............. 285/317 |
| 1,579,149 | A | * | 3/1926 | Rubelli et al. | ......... 285/14 |
| 2,241,089 | A | * | 5/1941 | Hampe et al. | ........ 285/409 |
| 3,606,391 | A | * | 9/1971 | Sinnott | ................. 285/38 |
| 3,830,528 | A | * | 8/1974 | Purdy | ................... 285/38 |
| 3,879,068 | A | * | 4/1975 | Stampfli | ............ 285/124.5 |

(Continued)

FOREIGN PATENT DOCUMENTS

EP    1429066 A1    6/2004

(Continued)

*Primary Examiner*—James M Hewitt
(74) *Attorney, Agent, or Firm*—Baker & Daniels LLP

(57) ABSTRACT

A sleeve for joining two pipes (4, 5), each configured with an end flange (2, 3), comprises a base plate (6) with a pipe receiving aperture (7) that is open on one side and is designed to receive a first pipe (4), two side walls (9, 10), and two cover plates (11, 12) between which a second pipe (5) can be interposed. Also present is a spring arm (13), which is connected to one side wall (10) and extends in the direction of the opposite side wall (9) and is able to pivot resiliently toward and away from the base plate (6) within a flexion zone (15). Configured on the spring arm (13) are an engaging claw (16) that extends in the direction of the base plate (6) and is configured to engage in a locking recess (17) introduced into at least one end flange, and a releasing element that extends away from the base plate (6). The pipes can thus be disconnected with relative ease.

8 Claims, 3 Drawing Sheets

U.S. PATENT DOCUMENTS

| | | | |
|---|---|---|---|
| 4,289,335 A * | 9/1981 | Olbermann | 285/91 |
| 4,352,511 A * | 10/1982 | Ribble et al. | 285/91 |
| 4,463,972 A * | 8/1984 | Weinhold | 285/148.21 |
| 4,787,770 A * | 11/1988 | Lewis | 403/317 |
| 4,913,468 A * | 4/1990 | Rattmann | 285/82 |
| 5,209,529 A * | 5/1993 | Yan et al. | 285/320 |
| 5,649,724 A * | 7/1997 | Wiethorn | 285/93 |
| 5,820,168 A * | 10/1998 | De Giacomoni | 285/192 |
| 6,250,693 B1 * | 6/2001 | Gensert et al. | 285/364 |
| 6,382,343 B1 * | 5/2002 | Engler | 180/417 |
| 6,508,491 B1 * | 1/2003 | Ebinger et al. | 285/223 |
| 7,338,086 B2 * | 3/2008 | Poder et al. | 285/81 |
| 2002/0093199 A1 * | 7/2002 | Le | 285/363 |
| 2006/0066103 A1 | 3/2006 | Auchter et al. | |

FOREIGN PATENT DOCUMENTS

| | | |
|---|---|---|
| FR | 850019 | 12/1939 |
| FR | 2856770 A1 | 12/2004 |
| GB | 2218350 A * | 11/1989 |
| WO | WO 2004051133 A1 * | 6/2004 |
| WO | WO2006/037404 A1 | 4/2006 |

* cited by examiner

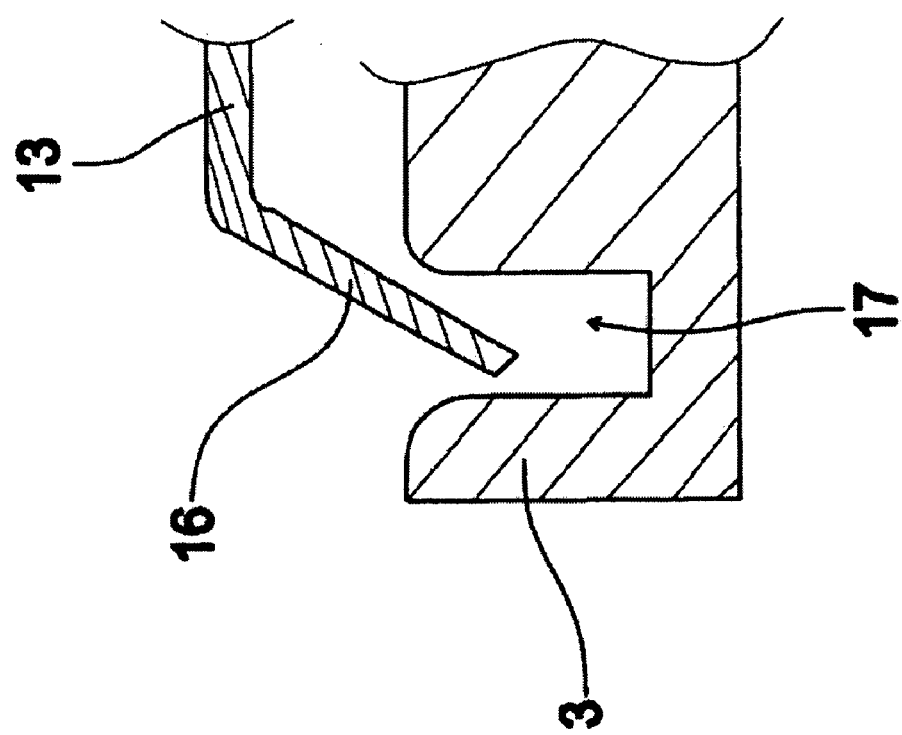

COLLAR FOR JOINING TWO PIPES COMPRISING ONE RESPECTIVE CONNECTING NECK

CROSS-REFERENCE TO RELATED APPLICATION

This application is a U.S. National Phase patent application based on International Application Serial No. PCT/EP2007/005190 filed Jun. 13, 2007, the disclosure of which is hereby explicitly incorporated by reference herein.

BACKGROUND OF THE INVENTION

1. Field of the Invention

The invention is directed to a sleeve for joining two pipes, each configured with an end flange.

2. Description of the Related Art

DE 30 35 669 A1 discloses a device with two parts that are detachably connected to each other by means of a latching hook. In that device, a first part comprises a latching edge and a second part comprises a latching hook with a latching lug that latches elastically behind the latching edge. The latching lug can be removed from engagement with the latching edge by sliding it, transversely to its latching direction, from its latched position into an open position, it being secured in this open position by a latching arrangement that prevents it from sliding transversely back into the latched position. The parts can thus be disconnected from each other relatively easily, without the need for extra effort in assembly or special tools.

FR 2 856 770 A1 discloses a sleeve for joining two pipes each configured with an end flange, comprising two radially outwardly protruding tongues which, when the sleeve is arranged around the end flanges, engage behind latching lugs formed on a receiving housing. This sleeve is relatively laborious to disconnect, however, since the latching hooks are disposed inside the receiving housing and can thus be accessed only with difficulty.

SUMMARY OF THE INVENTION

The present invention provides a sleeve for joining two pipes each configured with an end flange, which sleeve provides for relatively simple disconnection of the pipes.

The sleeve according to the invention can be slid over the end flanges of the pipes to be joined, after which, in a locked position, once the spring arm has rebounded, the engaging claw engages in the locking recess provided in one end flange and thus protects the sleeve against inadvertent removal. To remove the sleeve the spring arm must be pivoted against the deflection direction, by engaging a suitably configured tool with the releasing element, until the engagement of the engaging claw with the locking recess is released and the sleeve can again be withdrawn. This operation is easy to perform, but must be done intentionally in order to release the connection.

In one form thereof, the present invention provides a sleeve for joining two pipes each configured with an end flange, including a base plate with a pipe receiving aperture that is open on one side and is designed to receive a first pipe, two side walls adjoined to said base plate on opposite sides and in parallel with the pipe receiving aperture, two cover plates each adjoined to a respective side wall and between which a second pipe can be interposed, and a spring arm connected to one side wall and extending in the direction of the opposite side wall and able to pivot resiliently toward and away from the base plate within a flexion zone, wherein the spring arm comprises an engaging claw extending in the direction of the base plate and configured to engage in a locking recess introduced into at least one end flange, and a releasing element that extends away from the base plate.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a sectional representation of the engagement of an engaging claw of the inventive sleeve with a locking recess configured in an end flange.

Figure 1:
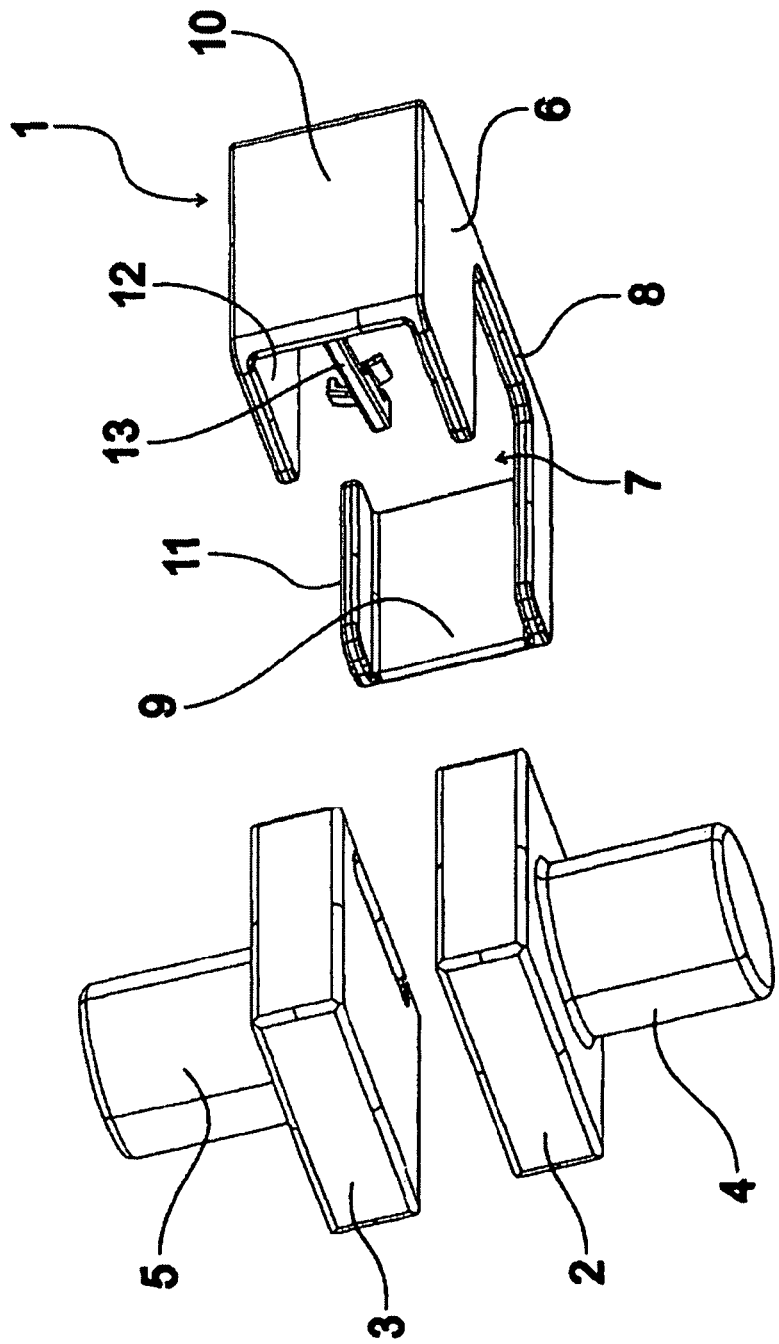
FIG. 1 is a perspective view of an exemplary embodiment of a sleeve according to the invention and two pipes configured with end flanges.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a sleeve 1 according to the invention, for joining two cylindrical pipes 4, 5 each configured with an end flange 2, 3. In the described exemplary embodiment, the end flanges 2, 3 are rectangular in shape and protrude radially beyond the pipes 4, 5.

The sleeve 1, which is made from an injection-molded plastic material or from a stamped and bent metal sheet, comprises a flat base plate 6 configured with a pipe receiving aperture 7 that is open on one side. Pipe receiving aperture 7 extends from its open side, in the longitudinal direction of the sleeve 1, to a transversely disposed end web 8, and has a width that corresponds to the outer diameter of, for example, first pipe 4. Formed on the opposite edge sides of the base plate 6 which are oriented parallel to the longitudinal direction of the sleeve 1 are side walls 9, 10, which are full walls in this exemplary embodiment, and which are oriented perpendicular to the base plate 6 and each extend in the same direction for a distance from the base plate 6 that corresponds to the thickness of the end flanges 2, 3 in the longitudinal direction of the pipes 4, 5.

Formed on the ends of side walls 9, 10 facing away from base plate 6 are cover plates 11, 12 oriented parallel to the base plate 6 and extending toward each other, and whose end faces turned away from side walls 9, 10 are a distance from each other that corresponds to the outer diameter of the second pipe 5 and, if the pipes 4, 5 are configured in the same manner, also the width of pipe receiving aperture 7. It can also be recognized from FIG. 1 that sleeve 1 is provided with a spring arm 13 of rectangular or square cross section, which is spacedly disposed from base plate 6 and, in the exemplary embodiment shown in FIG. 1, extends from second side wall 10 in the direction of first side wall 9 and terminates in the transverse direction above pipe receiving aperture 7, roughly in the center of pipe receiving aperture 7.

Figure 2:
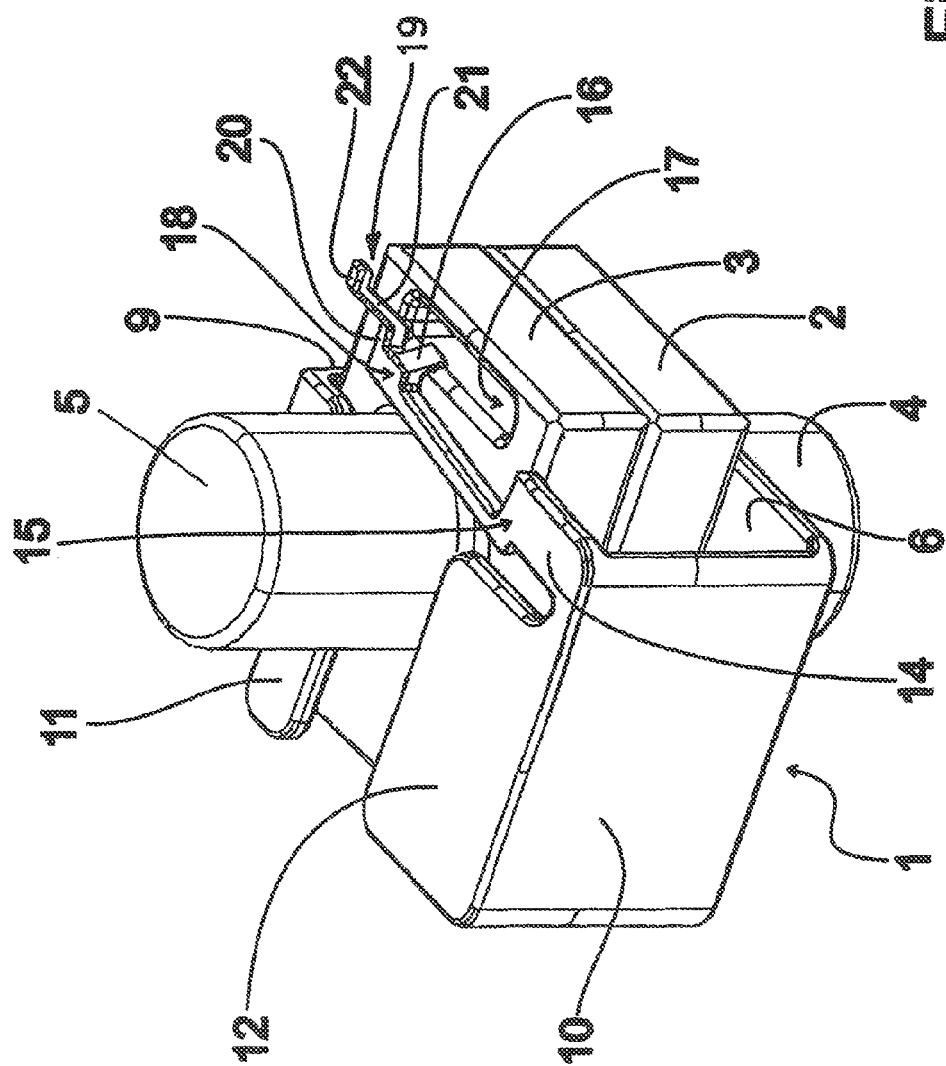
FIG. 2 is a perspective view of the exemplary embodiment according to FIG. 1 with the inventive sleeve slid onto the end flanges.

FIG. 2 is a perspective view of the exemplary embodiment according to FIG. 1, with the sleeve 1 slid over the fitted-together end flanges 2, 3, viewed in the direction of cover plates 11, 12. It is apparent from FIG. 2 that spring arm 13 is connected to second side wall 10 via a stem section 14 that extends from second side wall 10 toward first side wall 9 and is spacedly disposed from the corresponding cover plate 12, said stem section 14 having a larger cross section than spring arm 13. Stem section 14 thus is implemented as appreciably more resistant to bending than spring arm 13, with the result that spring arm 13 is able to pivot resiliently toward and away from base plate 6 within a flexion zone 15 located at the transition from spring arm 13 to stem section 14.

In an exemplary embodiment not shown, a spring arm 13 configured with a rectangular cross section has a greater material thickness in the plane of the cover plates 11, 12 than in a direction perpendicular to said plane, with the result that much less force needs to be applied in order to pivot the spring arm 13 toward or away from the base plate 6 than to bend the spring arm 13 in the plane of the cover plates 11, 12.

It can also be clearly understood from FIG. 2 that formed on the spring arm 13 roughly midway between the mutually confronting edge faces of cover plates 11, 12 is an engaging claw 16, which is in the form of a tongue section directed obliquely away from the open side of pipe receiving aperture 7 (not visible in FIG. 2) and which in the arrangement according to FIG. 2 is engaged in a locking recess 17 configured in second end flange 3 and preferably also in first end flange 2.

Formed on the opposite end portion 18 of spring arm 13 from flexion zone 15, in the vicinity of engaging claw 16, is a releasing element 19, which in the exemplary embodiment shown comprises a longitudinal portion 20, which is formed at right angles onto spring arm 13 and extends in the longitudinal direction of the sleeve 1; an oblique portion 21, adjoined to longitudinal portion 20 and extending obliquely away from base plate 6 and cover plates 11, 12; and an actuating portion 22, extending from the opposite end of oblique portion 21 from longitudinal portion 20 and away from cover plates 11, 12 in a plane parallel to cover plates 11, 12.

Actuating portion 22 is provided with a tool application surface, which faces toward the base plate 6 and which is planar in the exemplary embodiment shown, such that the spring arm 13 the engagement between the engaging claw 16 and the locking recess 17 can be released, for example by applying the blade of a screwdriver (not shown in FIG. 2) to the tool application surface and moving the blade of the screwdriver away from the base plate 6, such that the end flanges 2, 3 the pipes 4,5 can promptly be disconnected from each other by virtue of a relative movement between the sleeve 1 and the end flanges 2, 3 in the longitudinal direction of the sleeve 1, toward the open side of the pipe receiving aperture 7.

FIG. 3 is a sectional representation of the engagement of engaging claw 16 in locking recess 17 in the arrangement according to FIG. 2. It is obvious from FIG. 3 that due to the oblique position of engaging claw 16, movement of end flange 3 in the longitudinal direction of the direction of insertion into sleeve 1 is blocked as a result of that direction of movement being opposed by this oblique position, barring the application of such high forces as would destroy spring arm 13 or engaging claw 16, whereas in the case of movement in the insertion direction, resilient claw 16 rebounds against that edge face of second end flange 3 which is in front in the insertion direction.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A sleeve for joining two pipes each configured with an end flange, said sleeve comprising:
   a base plate including a pipe receiving aperture open on one side of said base plate, said aperture adapted to receive a first pipe;
   a pair of side walls adjoined to respective opposite sides said base plate, said side walls parallel with said pipe receiving aperture;
   a pair of cover plates each adjoined to a respective side wall and between which a second pipe is insertable; and
   a spring arm connected to one of said side walls and extending in a direction of an opposite said side wall, said spring arm resiliently pivotable toward and away from said base plate within a flexion zone, said spring arm including an engaging claw extending in a direction of said base plate and engagable in a locking recess within an end flange of a pipe, and a releasing element extending away from said base plate.

2. The sleeve of claim 1, wherein said spring arm has a rectangular cross section.

3. The sleeve of claim 1, wherein said spring arm has a greater material thickness in a plane of said cover plates than in a direction perpendicular to said plane.

4. The sleeve of claim 1, wherein said spring arm is adjoined to a stem portion formed onto one said side wall, said stem portion more resistant to bending than said spring arm.

5. The sleeve of claim 1, wherein said engaging claw is configured as a flat tongue section.

6. The sleeve of claim 5, wherein said tongue section extends obliquely away from the open side of said pipe receiving aperture and toward said base plate.

7. The sleeve of claim 1, wherein said releasing element comprises an actuating portion oriented parallel to said base plate.

8. The sleeve of claim 7, wherein said actuating portion comprises a planar tool application surface on a side thereof facing said base plate.

* * * * *